(12) United States Patent
Jaradi et al.

(10) Patent No.: US 10,882,426 B2
(45) Date of Patent: Jan. 5, 2021

(54) VEHICLE SEAT BELT SYSTEM

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US); Zhenyan Gao, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 55 days.

(21) Appl. No.: 16/105,003

(22) Filed: Aug. 20, 2018

(65) Prior Publication Data

US 2020/0055431 A1    Feb. 20, 2020

(51) Int. Cl.
*B60N 2/68* (2006.01)
*B60R 22/34* (2006.01)
*B60R 22/26* (2006.01)
*B60R 22/22* (2006.01)
*B60R 22/18* (2006.01)

(52) U.S. Cl.
CPC .............. *B60N 2/688* (2013.01); *B60R 22/22* (2013.01); *B60R 22/26* (2013.01); *B60R 22/34* (2013.01); *B60R 2022/1825* (2013.01); *B60R 2022/1843* (2013.01)

(58) Field of Classification Search
CPC . B60N 2/688; B60R 22/26; B60R 2022/1818; B60R 2022/1843; B60R 2022/1825; B60R 22/22; B60R 22/34; B60R 22/18
USPC .......................................................... 280/802
See application file for complete search history.

(56) References Cited

U.S. PATENT DOCUMENTS

| | | | | |
|---|---|---|---|---|
| 4,546,998 A * | 10/1985 | Suzuki | ................... | B60R 22/22 280/807 |
| 5,022,677 A * | 6/1991 | Barbiero | ................. | B60R 22/06 280/801.1 |
| 5,599,070 A | 2/1997 | Phyam et al. | | |
| 5,851,055 A * | 12/1998 | Lewis | ..................... | B60R 21/18 297/483 |
| 7,614,684 B2 * | 11/2009 | Yasuhara | ............. | B60K 15/063 296/187.09 |
| 7,644,992 B2 | 1/2010 | Becker et al. | | |
| 8,235,469 B2 * | 8/2012 | Meyer | .................. | B60N 2/0715 280/808 |
| 8,783,782 B2 | 7/2014 | Park | | |

(Continued)

FOREIGN PATENT DOCUMENTS

DE   202012100350 U1   4/2012
JP        P3375481 B2   11/2002

(Continued)

OTHER PUBLICATIONS

Translation of JP3375481 (Year: 1997).*

*Primary Examiner* — James A English
*Assistant Examiner* — Kurtis Nielson
(74) *Attorney, Agent, or Firm* — Frank A. MacKenzie; Bejin Bieneman PLC (57) ABSTRACT

A vehicle seating system includes a vehicle floor, a seat supported by the vehicle floor, a retractor mounted to the vehicle floor beneath the seat, a webbing guide supported by the seat, and a webbing extending from the retractor through the webbing guide.

15 Claims, 6 Drawing Sheets

(56) References Cited

U.S. PATENT DOCUMENTS

| | | | | |
|---|---|---|---|---|
| 2002/0011749 A1* | 1/2002 | Janz | B60R 22/24 | |
| | | | 297/482 | |
| 2002/0101092 A1* | 8/2002 | Bowers | B60N 2/688 | |
| | | | 296/68.1 | |
| 2003/0038525 A1* | 2/2003 | Pond | B60N 2/24 | |
| | | | 297/452.29 | |
| 2006/0170200 A1* | 8/2006 | Sundararajan | B60R 21/18 | |
| | | | 280/733 | |
| 2008/0012417 A1* | 1/2008 | Okazaki | B60R 22/26 | |
| | | | 297/468 | |
| 2008/0116679 A1* | 5/2008 | Burckhard | B60R 22/26 | |
| | | | 280/801.1 | |
| 2009/0146487 A1* | 6/2009 | Becker | B60N 2/688 | |
| | | | 297/483 | |
| 2012/0161429 A1* | 6/2012 | Rawlinson | B60L 50/64 | |
| | | | 280/801.1 | |
| 2013/0175826 A1* | 7/2013 | Bisror | B60R 22/22 | |
| | | | 296/193.07 | |
| 2018/0236970 A1* | 8/2018 | Farooq | B60R 22/48 | |

FOREIGN PATENT DOCUMENTS

| | | | | |
|---|---|---|---|---|
| JP | 3375481 B2 * | 2/2003 | | B60N 2/06 |
| JP | 2016169009 A | 9/2016 | | |
| WO | WO-2019110478 A1 * | 6/2019 | | B60N 2/22 |

* cited by examiner

VEHICLE SEAT BELT SYSTEM

BACKGROUND

Vehicles include seatbelts for each of the seats onboard. The seatbelt includes webbing that, when the seatbelt is buckled, passes across an occupant of the seat. An anchor attaches one end of the webbing to a seat frame. The other end of the webbing feeds into a retractor, which includes a spool that pays out and retracts the webbing. A tongue slides freely along the webbing and, when engaged with a buckle, divides the webbing into a lap band and a shoulder band. The seatbelt is typically a three-point harness, meaning that the webbing is attached at three points around the occupant when fastened: the anchor, the retractor, and the buckle.

DETAILED DESCRIPTION

A vehicle seating system includes a vehicle floor, a seat supported by the vehicle floor, a retractor mounted to the vehicle floor beneath the seat, a webbing guide supported by the seat, and a webbing extending from the retractor through the webbing guide.

The vehicle floor may include a seat cross member, the seat being supported by the seat cross member and the retractor may be mounted to the seat cross member.

The seat may include a seat back and the webbing guide may be supported by the seat back.

The webbing guide may include a frame and a roller rotatably attached to the frame and the webbing may ride on the roller.

The roller may include a low-friction coating.

The seat may include a cover, and the webbing guide may extend through the cover.

The vehicle seating system may further include a second webbing guide supported by the seat spaced from the webbing guide, the webbing extending through the second webbing guide.

The vehicle seating system may further include a sleeve extending from the second webbing guide to the webbing guide, the webbing extending through the sleeve.

The seat may include a seat back having a top and a bottom, the webbing guide may be supported by the top and a second webbing guide may be supported by the bottom.

The vehicle seating system may further include a sleeve extending from the second webbing guide to the webbing guide, the webbing extending through the sleeve.

The webbing may extend vertically from the webbing guide to the second webbing guide.

The seat back may include a front side designed to support an occupant and a back side opposite the front side, the webbing guide and the second webbing guide being supported by the back side.

The webbing may extend from the webbing guide to the front side of the seat back.

The seat back may include a frame having a first member and a second member elongated vertically, and an occupant seating area between the first member and the second member, the webbing guide and the second webbing guide being supported by the first member.

The webbing may extend vertically along the first member from the webbing guide to the second webbing guide.

The seat back may include a front side designed to support an occupant and a back side opposite the front side, the webbing guide and the second webbing guide being supported by the back side.

The webbing may extend from the webbing guide to the front side of the seat back and the webbing extends from the second webbing guide to the retractor in a vehicle-forward direction.

The webbing may extend from the second webbing guide to the retractor in a vehicle-forward direction.

The seat may include a seat back, the seat back including a front side designed to support an occupant and a back side opposite the front side, the webbing guide being supported by the back side.

With reference to the Figures, wherein like numerals indicate like parts throughout the several views, a vehicle seating system 10 for a vehicle 12 includes a vehicle floor 14, a seat 16 supported by the vehicle floor 14, a retractor 18 mounted to the vehicle floor 14 beneath the seat 16, a webbing guide 20, 22 supported by the seat 16, and a webbing 24 extending from the retractor 18 through the webbing guide 20, 22.

During a vehicle impact, the retractor 18 locks to prevent or limit payout of the webbing 24 from the retractor 18. The momentum of the occupant applies a load to the webbing 24. Since the retractor 18 is mounted to the vehicle floor 14 beneath the seat 16, the webbing 24 transfers the load to the vehicle floor 14, decreasing the load applied to the seat 16 by the webbing 24. The webbing guide 20, 22 being mounted to the seat 16 routes the webbing 24 to prevent the webbing 24 from twisting or roping, for example, during a vehicle oblique impact that pulls the webbing 24 in both vehicle-forward direction and a cross-vehicle direction. The prevention of twisting or roping can reduce compressive forces on the chest of the occupant.

Figure 1:
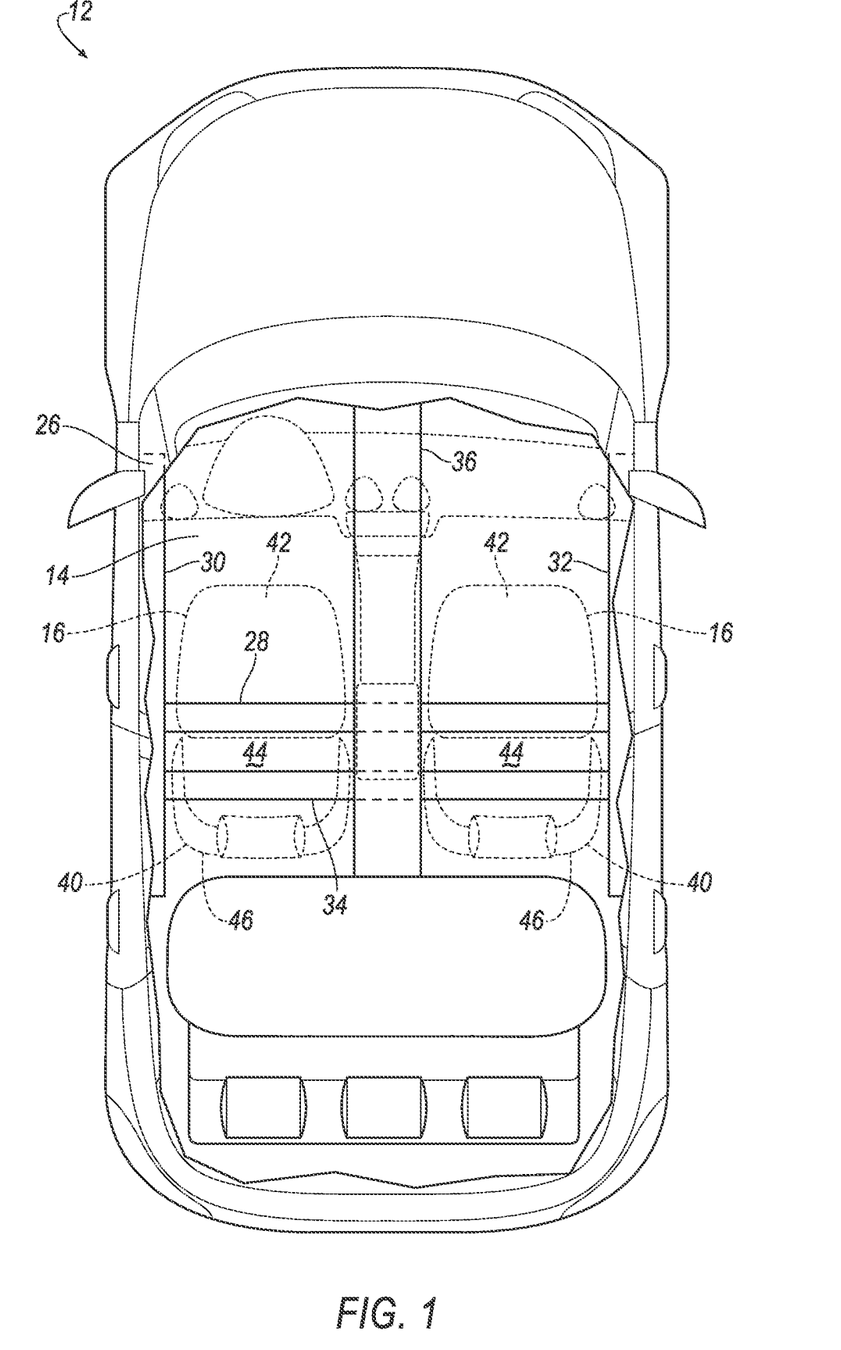
FIG. 1 is a plan view of a vehicle.

As shown in FIG. 1, the vehicle 12 includes a body 26. The body 26 may be of a unibody construction. In the unibody construction, the body 26 is unitary, i.e., a continuous one-piece unit. As another example not shown in the Figures, the body 26 and a frame may have a body-on-frame construction (also referred to as a cab-on-frame construction). In other words, the body 26 and the frame are separate components, i.e., are modular, and the body 26 is supported on and affixed to the frame. Alternatively, the body 26 and the frame may have any suitable construction. The body 26 and/or the frame may be formed of any suitable material, for example, steel, aluminum, etc.

Figure 2:
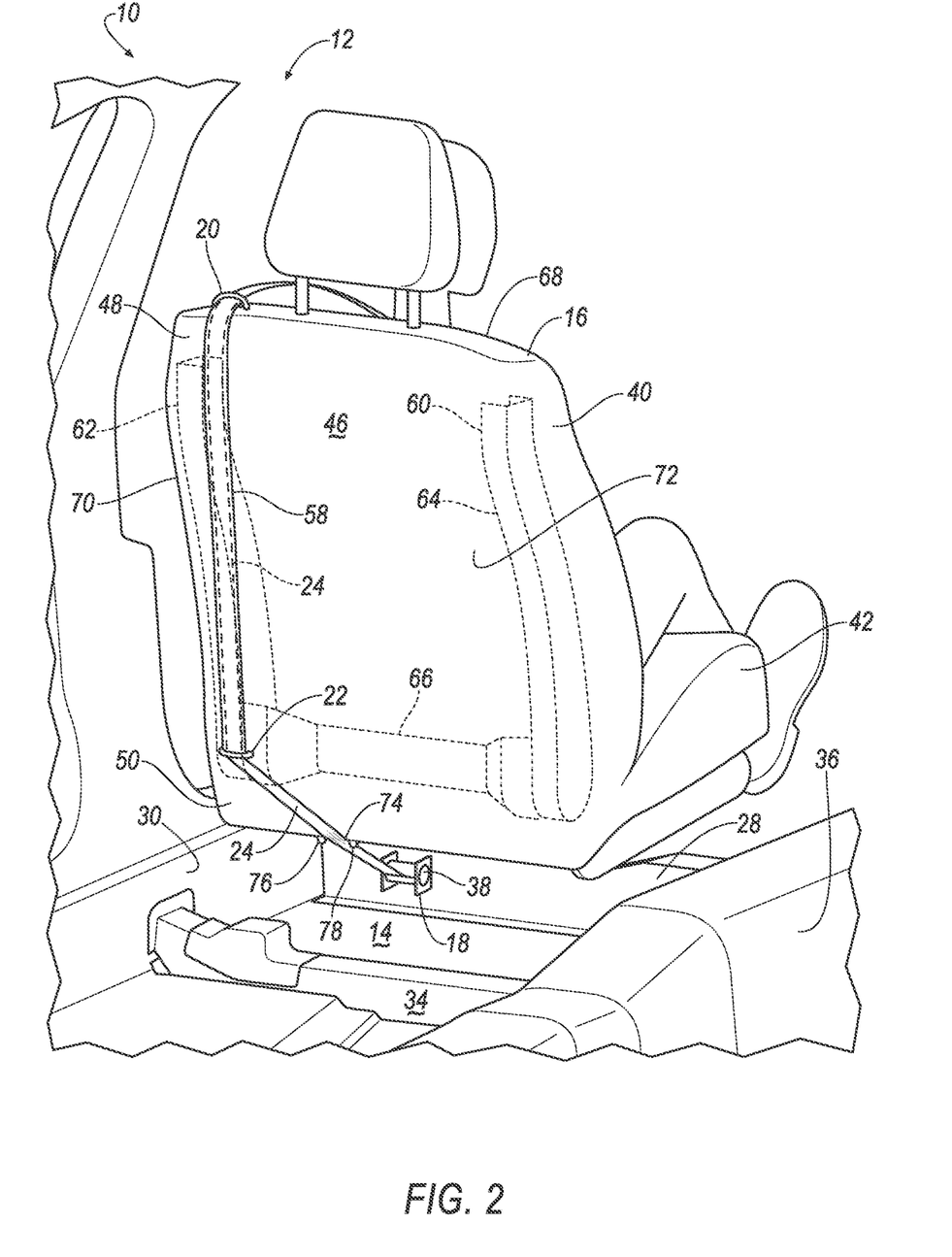
FIG. 2 is a perspective view of a vehicle seating system including seat, a first webbing guide, and a second webbing guide.
Figure 3:
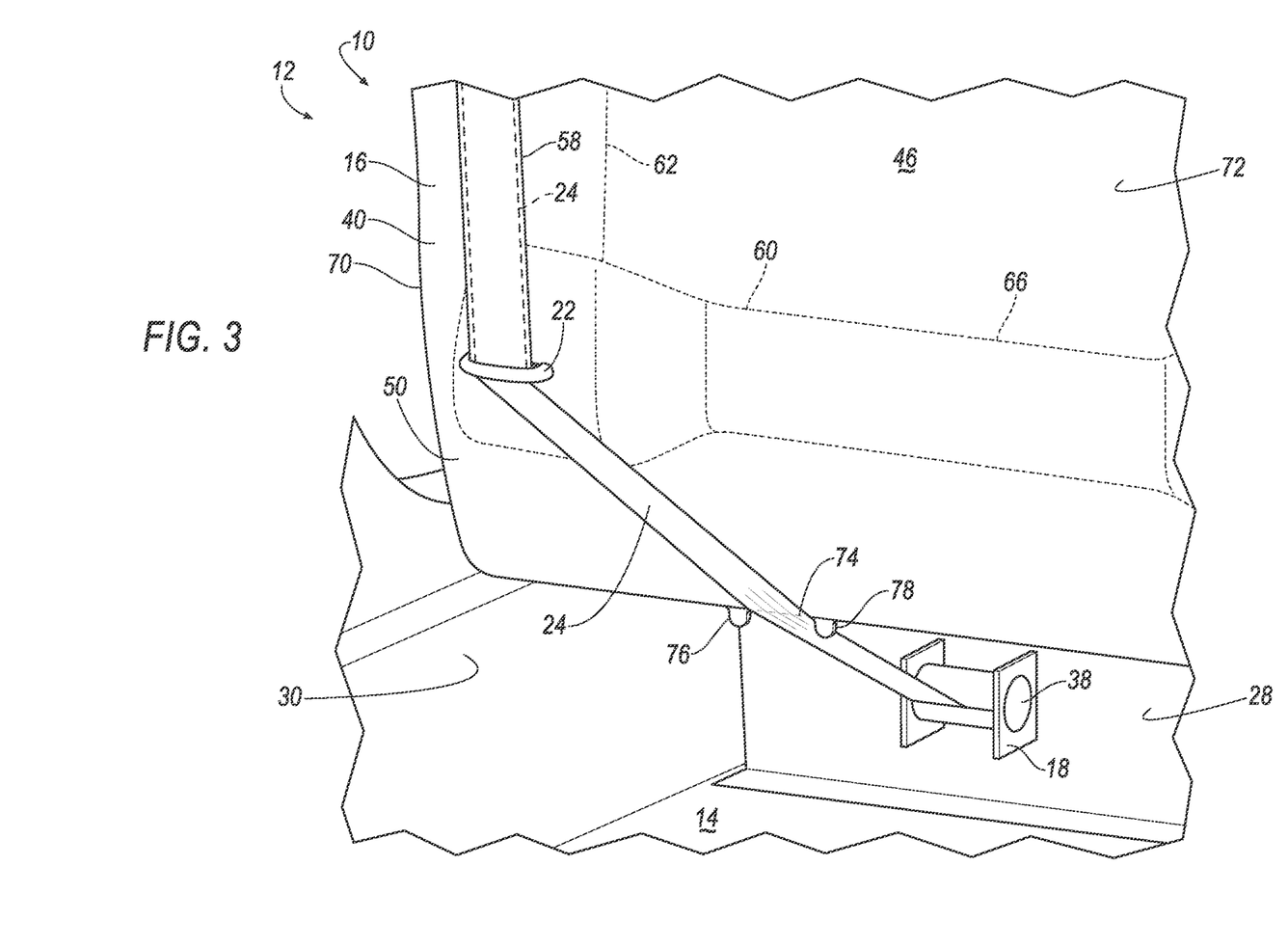
FIG. 3 is a perspective view of a retractor and a cross member.

As shown in FIG. 1-3, the body 26 and/or frame of the vehicle 12 may include sills 30, 32. The sills 30, 32 are spaced from each other in a cross-vehicle direction and may be elongated in a vehicle fore-and-aft direction. The sills 30, 32 may be at the left-most and the right-most position of the body 26. In other words, the sills 30, 32 may be the outmost components of the body 26.

The seat belt system 10 includes the vehicle floor 14, as shown in FIGS. 1-3. The vehicle floor 14 may be supported by the sills 30, 32. Specifically, the vehicle floor 14 may extend from one sill 30 to the other sill 32. The vehicle floor 14 may be mounted to the sills 30, 32, e.g., directly connected by welding and/or fastening. The vehicle floor 14 may extend from a front of a passenger compartment of the vehicle 12 to a rear of the passenger compartment. The vehicle floor 14 may be metal, e.g., steel, aluminum, etc.

The vehicle floor 14 may include a seat cross member 28. The seat cross member 28 may be positioned in the vehicle floor 14 to support the seat 16. The seat cross member 28 is elongated in a cross-vehicle direction. The seat cross member 28 may be supported by the sills 30, 32. Specifically, the seat cross member 28 may extend from one sill 30 to the other sill 32. The seat cross member 28 may be mounted to the sills 30, 32, e.g., directly connected by welding and/or fastening.

In addition to the seat cross member 28, the vehicle floor 14 may include any suitable number of cross members elongated in a cross-vehicle direction and supported by the sills 30, 32, e.g., mounted to the sills 30, 32. For example, the vehicle floor 14 may include a rear cross member 34, as shown in FIGS. 1-2. The vehicle floor 14 may include panels (not numbered) between the cross members, e.g., between the seat cross member 28 and the rear cross member 34.

The vehicle floor 14 may include a tunnel 36, as shown in FIGS. 1-2. The tunnel 36 may be elongated in a vehicle fore-and aft direction between the sills 30, 32. The tunnel 36 may be equidistant between the sills 30, 32. The seat cross member 28 and/or other cross members of the vehicle floor 14, e.g., the rear cross member 34, may extend across the tunnel 36 and/or may be intersected by the tunnel 36, e.g., bisected by the tunnel. The vehicle floor 14 may be unitary, e.g., stamped from a single piece of material. In other words, the seat cross member 28, other cross members (e.g., rear cross member 34), tunnel 36, etc., may be unitary.

As shown in FIGS. 2-3, the retractor 18 is mounted to the seat cross member 28, i.e., directly connected to the seat cross member 28. For example, the retractor 18 may be mounted to the seat cross member 28 with fasteners. As set forth above, during a vehicle impact, the retractor 18 locks to prevent or limit payout of the webbing 24 from the retractor 18. The momentum of the occupant applies a load to the webbing 24. Since the retractor 18 is mounted to the seat cross member 28, the webbing 24 transfers the load to the seat cross member 28, decreasing the load applied to the seat 16 by the webbing 24. As another example, the retractor 18 may be mounted to another cross member of the vehicle 12, e.g., the rear cross member 34.

As set forth below, the retractor 18 is beneath the seat 16, e.g., mounted to the seat cross member 28 beneath the seat 16. This configuration creates an advantageous routing of the webbing 24, as described below, to prevent the webbing 24 from twisting or roping and/or to increase the mounting stability of the retractor 18 to the seat cross member 28.

As set forth above, the seat 16 is supported by the vehicle floor 14. For example, the seat 16 may be mounted to the vehicle floor 14, e.g., directly connected by fastening. As an example, the seat 16 may be supported by, e.g., mounted to, the seat cross member 28. The seat 16, for example, may include a track that is supported by, e.g., mounted to, the seat cross member 28. As shown FIGS. 2 and 3, both the retractor 18 and the seat 16 may be supported by, e.g., mounted to, the seat cross member 28. In other words, during a vehicle impact, the seat cross member 28 both supports the seat 16 and absorbs forces from the retractor 18 resulting from the webbing 24 being pulled by the occupant. In such an example, the seat cross member 28 is the common feature that performs both of these functions.

The seat cross member 28 may be designed to absorb energy during the vehicle impact. In other words, the seat cross member 28 has a size, shape, material type, and/or interaction with other vehicle components, etc., to absorb the forces applied by the seat 16 and the retractor 18 during vehicle impact. The seat 16 shown in FIGS. 2-7 is located in a front passenger seat position. Alternatively, or in addition, the seat 16 may be located in any suitable position of the vehicle 12. In other words, the vehicle 12 may include any suitable number of seats 16 each a component of separate vehicle seating systems 10.

The seat 16 may include a seat back 40 and a seat bottom 42. The seat back 40 may be supported by the seat bottom 42 and may be stationary or movable relative to the seat bottom 42. The seat back 40 and the seat bottom 42 may be adjustable in multiple degrees of freedom.

The seat bottom 42 and/or the seat back 40 may include a frame and a covering 72 supported on the frame. The frame of the seat back 40 is identified with reference numeral 60. The frame may include tubes, beams, etc. The frame may be formed of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc.

The covering 72 of the seat 16 may include upholstery and padding. The upholstery may be formed of cloth, leather, faux leather, or any other suitable material. The upholstery may be stitched in panels around the frame. The padding may be between the covering and the frame and may be foam or any other suitable material. The covering 72 may present a class-A surface.

Figure 4:
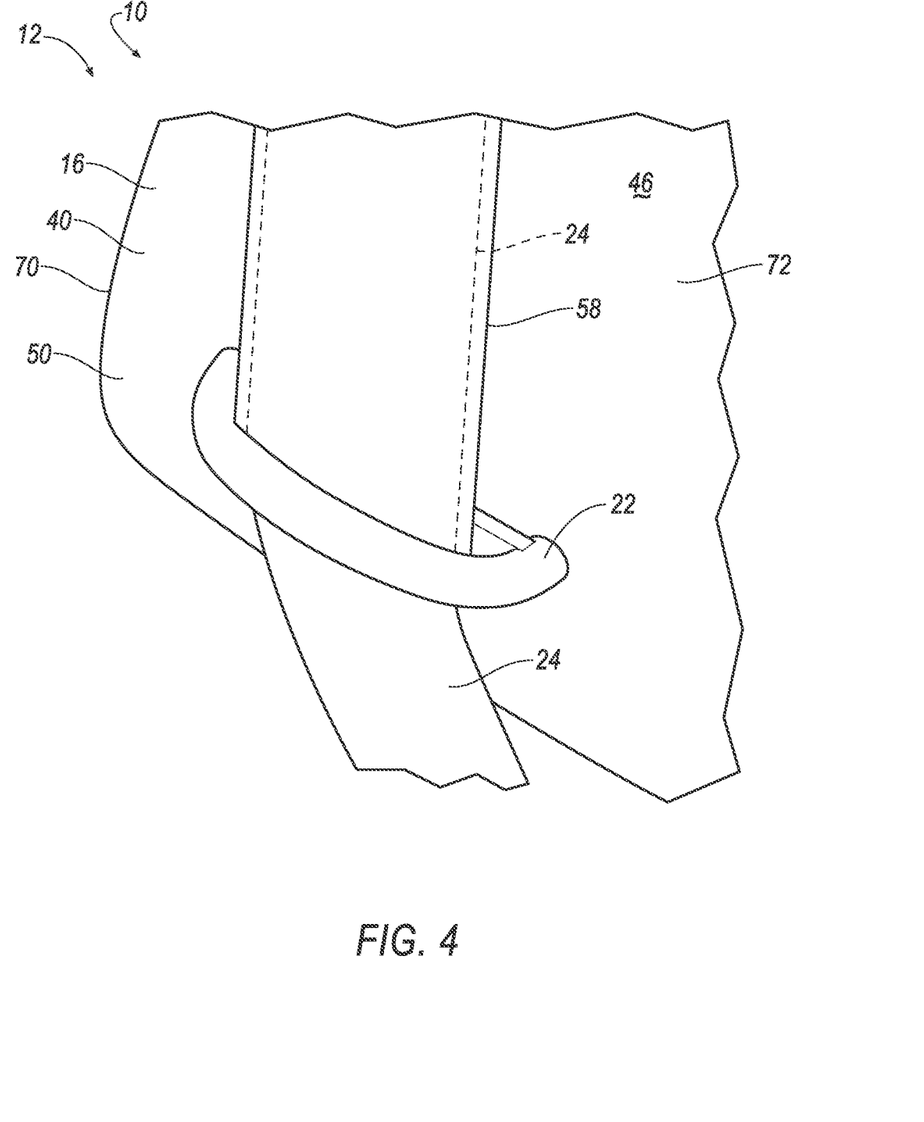
FIG. 4 is a perspective view of the second webbing guide at a bottom of the seat.
Figure 5:
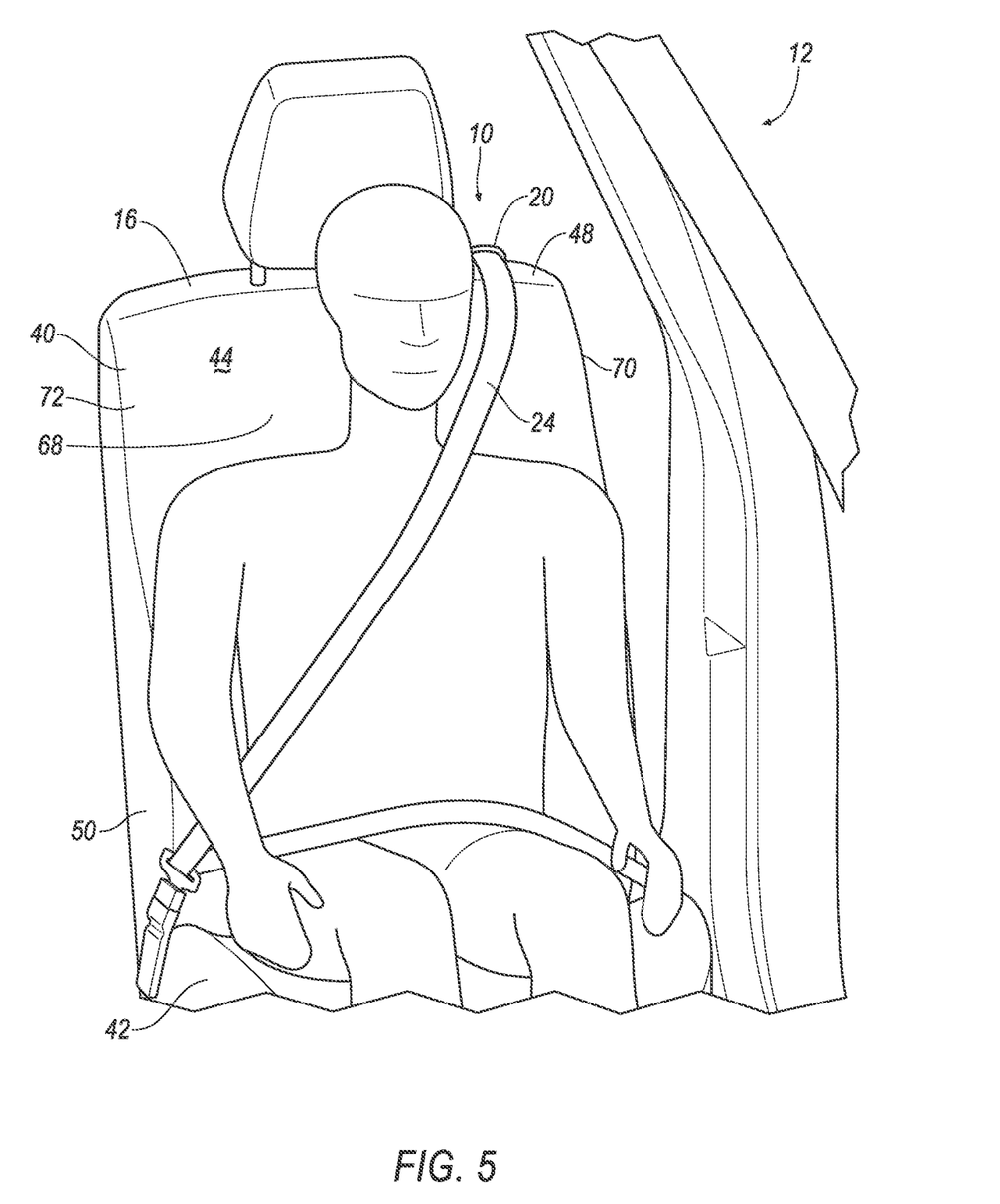
FIG. 5 is a front view of the seat.

The seat back 40 may have a front side 44 and a back side 46, as shown in FIGS. 1-7. The front side 44 may be designed to support the occupant, as shown in FIG. 5. The back side 46 may be disposed opposite the front side 44. The seat back 40 may have a top 48 and a bottom 50, as shown in FIGS. 2-7. The top 48 may be the uppermost portion of the seat back 40. The seat back 40 may include a curved surface 74 at the bottom 50 and back side 46 of the seat back 40. As discussed below, the webbing 24 may extend across the curved surface 74.

The frame 60 of the seat back 40 may include a first member 62 and a second member 64 each elongated vertically, as shown in FIGS. 2-3. The frame 60 may include a third member 66 extending between the first member 62 and the second member 64. The first member 62 and the second member 64 may be the outermost portion of the frame 60. The frame 60 may include an occupant seating area 68 between the first member 62 and the second member 64, as shown in FIGS. 2 and 5. The occupant may be disposed in the occupant seating area 68.

The seat 16 may include side bolsters 70 on opposite sides of the seat 16, as shown in FIGS. 2-7. The side bolsters 70 may each include the frame 60, the covering 72, and cushioning therebetween. Specifically, one side bolster 70 includes the first member 62 of the frame 60 and the other side bolster 70 includes the second member 64 of the frame 60. The side bolster 70 may support the occupant in the cross-vehicle direction. In other words, the side bolster 70 abuts the shoulders and/or sides of the occupant and/or may nest the occupant between the side bolsters 70.

The vehicle seating system 10 includes the retractor 18, as shown in FIGS. 2-3. The retractor 18 stores and deploys the webbing 24. The retractor 18 may include a rotatable core 38 that rotates when the occupant pulls on the webbing 24, allowing payout of the webbing 24. When the occupant releases the webbing 24, the rotatable core 38 retracts, i.e., rotates to spool the webbing 24 about the rotatable core 38. During the vehicle impact, the retractor 18 may lock the webbing 24, preventing payout of the webbing 24.

The webbing 24 is mounted at at least three mounting points. For example, the webbing 24 shown in the Figures is mounted at the retractor 18; a buckle (shown and not numbered in FIG. 5) that is fixed either to the seat 16, the vehicle floor 14, or another component of the body 26; and a fixed point at either to the seat 16, the vehicle floor 14, or another component of the body 26. The webbing 24 may carry a clip (shown and not numbered in FIG. 5) for releasably engaging the buckle.

The vehicle seating system 10 includes a first webbing guide 20 and a second webbing guide 22, as shown in FIGS. 2-7. The second webbing guide 22 may be spaced from the first webbing guide 20. The webbing 24 extends from the retractor 18 through the first webbing guide 20 and the second webbing guide 22. Specifically, the webbing 24 extends from the retractor 18 through the second webbing guide 22 to the first webbing guide 20, as shown in FIG. 2. The webbing 24 may extend vertically from the second webbing guide 22 to the first webbing guide 20. The webbing 24 may extend from the second webbing guide 22 to the retractor 18 in a vehicle-forward direction. The webbing guides 20, 22 being mounted to the seat 16 route the webbing 24 to prevent the webbing 24 from twisting or roping, for example, during a vehicle oblique impact that pulls the webbing 24 in both vehicle-forward direction and a cross-vehicle direction. The prevention of twisting or roping can reduce compressive forces on the chest of the occupant.

The first webbing guide 20 and the second webbing guide 22 are supported by the seat back 40. For example, the first webbing guide 20 and/or the second webbing guide 22 may be supported by the side bolster 70. Specifically, the first webbing guide 20 and/or the second webbing guide 22 may be mounted to the seat back 40, e.g., directly connected by fasteners, welding, etc. For example, the first webbing guide 20 and/or the second webbing guide 22 may be mounted to the first member 62. The first webbing guide 20 and/or the second webbing guide 22 may be mounted to the frame 60 and may extend through the covering 72. Specifically, the first webbing guide 20 and/or the second webbing guide 22 may be mounted to the back side 46 of the seat back 40. The webbing 24 extends from the from the first webbing guide 20 to the front side 44 of the seat back 40.

The first webbing guide 20 may be supported by the seat back 40 at the top 48 of the seat back 40. The second webbing guide 22 may be supported by the seat back 40 at the bottom 50. The webbing 24 may extend from the bottom 50 of the seat back 40 through the second webbing guide 22 to the top 48 of the seat back 40 and through the first webbing guide 20.

The webbing 24 may extend vertically along the first member 62 from the first webbing guide 20 to the second webbing guide 22. In other words, the webbing 24 extends vertically along the bolster 70.

The webbing 24 may extend across the curved surface 74 from the retractor 18 to the second webbing guide 22. The curved surface 74 may reduce friction between the webbing 24 and the seat 16, reducing energy lost to friction as the webbing 24 moves along curved surface 74. The curved surface 74 may be disposed between the first edge 76 and the second edge 78. The first edge 76 and the second edge 78 may direct the webbing 24 toward the second webbing guide 22, preventing the webbing 24 from moving in the vehicle-lateral direction along the seat 16. The curved surface 74, the first edge 76, and the second edge 78 may reduce twisting of the webbing 24.

Figure 6:
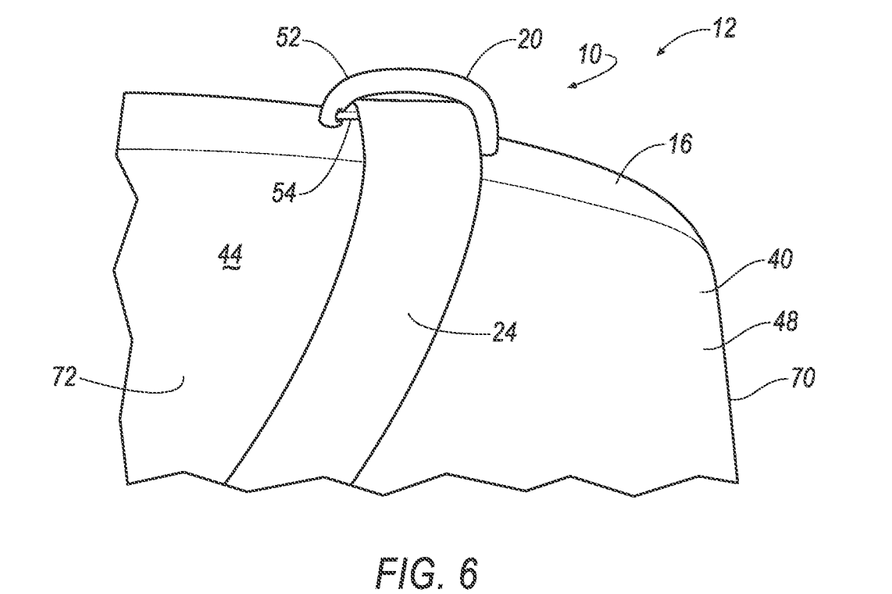
FIG. 6 is a front view of the first webbing guide with webbing therethrough.
Figure 7:
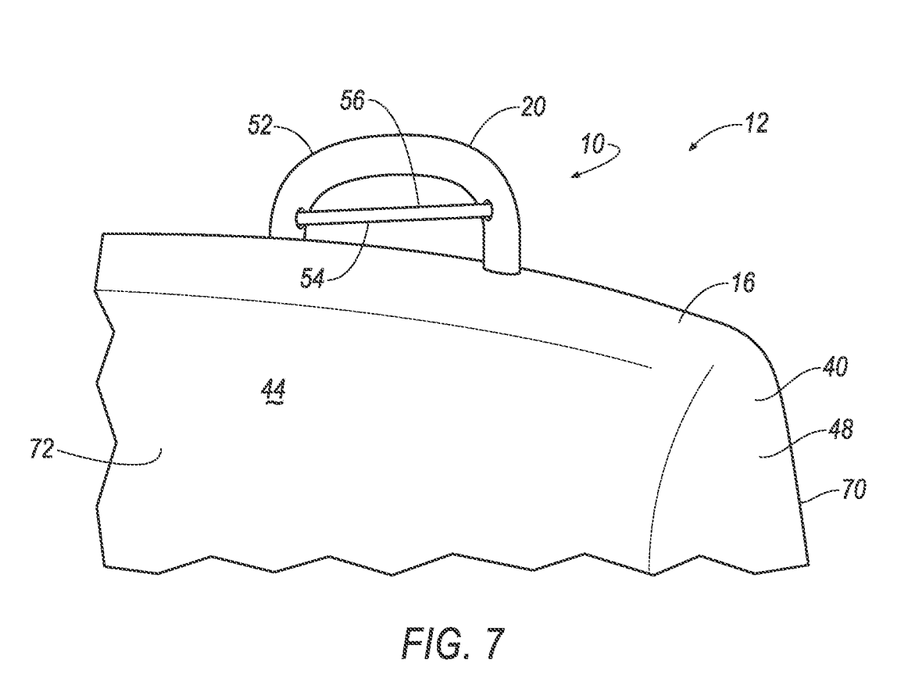
FIG. 7 is a front view of the first webbing guide with the webbing removed.

The first webbing guide 20 may include a frame 52 and a roller 54, as shown in FIGS. 6-7. The frame 52 may be mounted to the seat back 40. The roller 54 may be rotatably attached to the frame 52. The webbing 24 may ride on the roller 54, as shown in FIG. 6. As the occupant pulls on the webbing 24, the webbing 24 may engage the roller 54, rolling the roller 54 relative to the frame 52. The roller 54 may include a low-friction coating 56, e.g., tetrafluoroethylene, graphite, silicone, etc. The low-friction coating 56 may allow the webbing 24 to ride on the roller 54 while losing less energy to the roller 54 from friction.

The vehicle seating system 10 may include a sleeve 58, as shown in FIGS. 2-4. The sleeve 58 may extend from the second webbing guide 22 to the first webbing guide 20. The webbing 24 may extend through the sleeve 58 between the first webbing guide 20 and the second webbing guide 22. The sleeve 58 may be fixed relative to the first webbing guide 20 and the second webbing guide 22. As an example, the sleeve 58 may be fixed to the first webbing guide 20 and/or the second webbing guide 22, e.g., by unitary construction, adhesive, fasteners, etc. As another example, the sleeve 58 may be fixed to another component of the seat back 40, e.g., the frame 60. The sleeve 58 may be outside of or inside of the covering 72. The sleeve 58 may guide and/or protect the webbing 24 moving between the first webbing guide 20 and the second webbing guide 22. The sleeve 58 may be rigid relative to the webbing 24. The sleeve 58 may be, for example, plastic or metal.

The mounting of the retractor 18 to the seat cross member 28 and the routing of the webbing 24 provides a rigid mounting for the retractor 18 while absorbing forces on the webbing 24 during a vehicle impact by preventing the webbing 24 from twisting or roping, for example, during a vehicle oblique impact that pulls the webbing 24 in both vehicle-forward direction and a cross-vehicle direction. The prevention of twisting or roping can reduce compressive forces on the chest of the occupant. Specifically, the webbing 24 extends from the retractor 18 across the curved surface 74 to the second webbing guide 22. The second webbing guide 22 routes the webbing 24 toward the first webbing guide 20, e.g., through the sleeve 58. The webbing 24 exits the first webbing guide 22 across the front side 44 of the seat back 40. During a vehicle impact, the retractor 18 locks to prevent or limit payout of the webbing 24 from the retractor 18. The momentum of the occupant applies a load to the webbing 24. This routing of the webbing 24 prevents the webbing 24 from twisting or roping as described above and delivers the forces from webbing 24 to the retractor 18 to the seat cross member 28.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order.

Many modifications and variations of the present disclosure are possible in light of the above teachings, and the disclosure may be practiced otherwise than as specifically described.

What is claimed is:

1. A vehicle seating system, comprising:
a vehicle floor including a seat cross member defining a rearward surface facing a vehicle-rearward direction;
a seat supported by the seat cross member, the seat including a seat back, the seat back including a front side designed to support an occupant and a back side opposite the front side, the seat back including a curved surface at a bottom of the back side;
a retractor directly connected to the rearward surface of the seat cross member beneath the seat;
a webbing guide supported by the back side of the seat; and
a webbing extending from the retractor through the webbing guide, the webbing contacting the curved surface between the retractor and the webbing guide.

2. The vehicle seating system of claim 1, wherein the webbing guide includes a frame and a roller rotatably attached to the frame and the webbing rides on the roller.

3. The vehicle seating system of claim 2, wherein the roller includes a low-friction coating.

4. The vehicle seating system of claim 1, wherein the seat includes a cover, and the webbing guide extends through the cover.

5. The vehicle seating system of claim 1, further comprising a second webbing guide supported by the seat spaced from the webbing guide, the webbing extending through the second webbing guide.

6. The vehicle seating system of claim 5, further comprising a sleeve extending from the second webbing guide to the webbing guide, the webbing extending through the sleeve.

7. The vehicle seating system of claim 1, wherein the seat back includes a top, the webbing guide being supported by the top of the seat back and a second webbing guide being supported by the bottom of the seat back.

8. The vehicle seating system of claim 7, further comprising a sleeve extending from the second webbing guide to the webbing guide, the webbing extending through the sleeve.

9. The vehicle seating system of claim 7, wherein the webbing extends vertically from the webbing guide to the second webbing guide.

10. The vehicle seating system of claim 7, wherein the seat back includes a frame having a first member and a second member elongated vertically, and an occupant seating area between the first member and the second member, the webbing guide and the second webbing guide being supported by the first member.

11. The vehicle seating system of claim 10, wherein the webbing extends vertically along the first member from the webbing guide to the second webbing guide.

12. The vehicle seating system of claim 11, wherein the webbing guide and the second webbing guide are supported by the back side of the seat back.

13. The vehicle seating system of claim 12, wherein the webbing extends from the webbing guide to the front side of the seat back and the webbing extends from the second webbing guide to the retractor in a vehicle-forward direction.

14. The vehicle seating system of claim 1, wherein the webbing extends from the webbing guide to the front side of the seat back.

15. The vehicle seating system of claim 1, wherein the seat back includes a first edge and a second edge each protruding downwardly from the bottom of the seat back, the curved surface being between the first edge and the second edge to retain the webbing on the curved surface.

* * * * *